United States Patent
Himmelmann

(10) Patent No.: US 9,776,720 B2
(45) Date of Patent: Oct. 3, 2017

(54) AIR CUSHION AIRCRAFT CARGO LOADING SYSTEMS AND WIRELESS COMMUNICATION UNIT

(71) Applicant: Goodrich Corporation, Charlotte, NC (US)

(72) Inventor: Richard Himmelmann, Beloit, WI (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/332,857

(22) Filed: Oct. 24, 2016

(65) Prior Publication Data

US 2017/0036763 A1    Feb. 9, 2017

Related U.S. Application Data

(62) Division of application No. 14/512,011, filed on Oct. 10, 2014, now Pat. No. 9,511,860.

(51) Int. Cl.
*B65G 51/03* (2006.01)
*B64D 9/00* (2006.01)

(52) U.S. Cl.
CPC ............. *B64D 9/00* (2013.01); *B65G 51/03* (2013.01); *B64D 2009/006* (2013.01)

(58) Field of Classification Search
CPC .............................. B65G 51/03; B65G 25/04; B65G 2814/0398; B64C 1/20; B64C 1/22; B64D 9/00; B64D 1/10; B64D 2009/006; H02J 7/025; B64F 1/32
USPC ..... 406/51, 73, 76, 88, 192, 198; 198/468.6, 198/468.9; 244/118.1, 137.1; 414/676
See application file for complete search history.

(56) References Cited

U.S. PATENT DOCUMENTS

| | | | |
|---|---|---|---|
| 1,437,964 | A | 12/1922 | Flitch |
| 2,918,183 | A | 12/1959 | Petersen |
| 3,055,446 | A | 9/1962 | Vaughen |
| 3,081,886 | A | 3/1963 | Flexman et al. |
| 3,190,460 | A | 6/1965 | Rubin |
| 3,209,929 | A | 10/1965 | Petersen et al. |
| 3,282,359 | A | 11/1966 | Satterfield, Jr. |
| 3,513,934 | A | 5/1970 | Crowley |
| 3,561,623 | A | 2/1971 | Mccaul |

(Continued)

FOREIGN PATENT DOCUMENTS

| | | |
|---|---|---|
| AU | 442872 | 11/1973 |
| BE | 723545 | 4/1969 |

(Continued)

OTHER PUBLICATIONS

U.S. Appl. No. 15/373,536, filed Dec. 9, 2016 and entitled Pressure Compensating Air Curtain for Air Cushion Supported Cargo Loading Platform.

(Continued)

*Primary Examiner* — Joseph Dillon, Jr.
(74) *Attorney, Agent, or Firm* — Timothy Buckley; Snell & Wilmer L.L.P.

(57) ABSTRACT

A cargo management system is provided including an air cushion cargo shuttle, an air blower configured to blow air beneath the air cushion cargo shuttle, and a first wireless communication device on the air cushion cargo shuttle. A cargo shuttle may also include a wireless communication device on the cargo shuttle, and a power drive unit on the cargo shuttle.

6 Claims, 7 Drawing Sheets

(56) References Cited

U.S. PATENT DOCUMENTS

| | | | |
|---|---|---|---|
| 3,595,407 A * | 7/1971 | Muller-Kuhn | B64F 1/32 |
| | | | 244/137.1 |
| 3,597,117 A | 8/1971 | Zoehfeld | |
| 3,756,342 A | 9/1973 | Burdick | |
| 3,756,544 A | 9/1973 | Bader | |
| 3,773,391 A | 11/1973 | Crandell et al. | |
| 3,776,492 A | 12/1973 | Iben | |
| 3,780,823 A | 12/1973 | Michaud | |
| 3,796,279 A | 3/1974 | Burdick | |
| 3,807,035 A | 4/1974 | Moorman | |
| 3,809,268 A | 5/1974 | Lutz | |
| 3,869,028 A | 3/1975 | Sawada | |
| 3,899,092 A | 8/1975 | Nordstrom | |
| 3,908,785 A | 9/1975 | Vaughen | |
| 3,986,605 A | 10/1976 | Dooley et al. | |
| 4,131,320 A | 12/1978 | Volat et al. | |
| 4,139,071 A | 2/1979 | Tackett | |
| 4,155,421 A | 5/1979 | Johnson | |
| 4,216,927 A | 8/1980 | Byrd | |
| 4,304,521 A | 12/1981 | Hammond | |
| 4,353,457 A | 10/1982 | Haley | |
| 4,354,796 A | 10/1982 | Bergman | |
| 4,441,571 A | 4/1984 | Wood | |
| 4,544,319 A | 10/1985 | Folling et al. | |
| 4,567,957 A | 2/1986 | Johnson | |
| 4,600,169 A | 7/1986 | Koster et al. | |
| 4,618,292 A | 10/1986 | Judge et al. | |
| 4,658,951 A * | 4/1987 | Saunders | B65G 47/261 |
| | | | 198/718 |
| 4,676,699 A | 6/1987 | Leonov | |
| 4,804,077 A | 2/1989 | John | |
| 4,815,926 A | 3/1989 | Chaffee et al. | |
| 4,878,635 A | 11/1989 | Nordstrom | |
| 4,951,770 A | 8/1990 | Vaughen | |
| 4,984,756 A | 1/1991 | Anders | |
| 5,120,184 A | 6/1992 | Gerawan | |
| 5,137,367 A | 8/1992 | Madonia et al. | |
| 5,184,366 A | 2/1993 | Rawdon | |
| 5,207,115 A | 5/1993 | Takei | |
| 5,226,773 A | 7/1993 | Morito | |
| 5,311,973 A | 5/1994 | Tseng et al. | |
| 5,350,270 A | 9/1994 | Stallard et al. | |
| 5,456,556 A | 10/1995 | Petrovic | |
| 5,467,827 A * | 11/1995 | McLoughlin | A62C 27/00 |
| | | | 137/355.17 |
| 5,634,636 A | 6/1997 | Jackson et al. | |
| 5,690,567 A | 11/1997 | DeNijs et al. | |
| 5,779,296 A * | 7/1998 | Hewko | A61G 1/06 |
| | | | 244/118.6 |
| 5,850,906 A | 12/1998 | Dean | |
| 5,893,450 A | 4/1999 | Metivier | |
| 6,193,043 B1 * | 2/2001 | Langston | B65G 13/11 |
| | | | 193/35 SS |
| 6,196,788 B1 | 3/2001 | Talbot et al. | |
| 6,296,588 B1 | 10/2001 | Ciemniecki | |
| 6,310,286 B1 | 10/2001 | Troxel | |
| 6,427,947 B1 | 8/2002 | Rohrlick et al. | |
| 6,495,761 B1 | 12/2002 | Hacker | |
| 6,517,028 B2 | 2/2003 | Huber | |
| 6,630,633 B1 | 10/2003 | Uber et al. | |
| 6,640,963 B2 | 11/2003 | Lecrivain | |
| 6,923,606 B2 * | 8/2005 | Fehrle | A61G 1/06 |
| | | | 211/173 |
| 7,073,994 B2 | 7/2006 | Huber et al. | |
| 7,108,474 B2 | 9/2006 | Moriya et al. | |
| 7,210,280 B2 | 5/2007 | Cottone | |
| 7,393,159 B2 | 7/2008 | Chang et al. | |
| 7,426,974 B1 | 9/2008 | Yeghiayan | |
| 7,494,004 B2 | 2/2009 | Stolyar et al. | |
| 7,513,716 B2 | 4/2009 | Hayashi et al. | |
| 7,643,133 B2 | 1/2010 | Milender | |
| 7,695,235 B1 | 4/2010 | Rallis | |
| 7,785,056 B2 | 8/2010 | Sanford et al. | |
| 7,800,009 B2 | 9/2010 | Gochar, Jr. | |
| 7,845,898 B2 | 12/2010 | Rawdon et al. | |
| 7,886,920 B2 * | 2/2011 | Colley | A63J 5/12 |
| | | | 212/316 |
| 7,913,950 B2 | 3/2011 | Huber | |
| 8,056,701 B2 | 11/2011 | Sugimoto | |
| 8,162,571 B2 | 4/2012 | Wada et al. | |
| 8,356,966 B2 | 1/2013 | Voorhees | |
| 8,376,124 B1 | 2/2013 | Rosen | |
| 8,499,922 B2 | 8/2013 | Hoshi | |
| 8,602,204 B2 | 12/2013 | Yang et al. | |
| 8,960,607 B2 * | 2/2015 | Dorris, III | B64D 1/10 |
| | | | 244/137.1 |
| 9,156,553 B1 | 10/2015 | Johnson | |
| 9,205,923 B1 | 12/2015 | Himmelmann | |
| 9,284,130 B1 | 3/2016 | Himmelmann | |
| 9,290,270 B2 | 3/2016 | Himmelmann | |
| 9,352,835 B2 | 5/2016 | Himmelmann | |
| 9,387,931 B2 | 7/2016 | Himmelmann | |
| 9,452,901 B2 | 9/2016 | Panzram | |
| 9,511,860 B2 | 12/2016 | Himmelmann | |
| 9,511,861 B2 | 12/2016 | Himmelmann | |
| 9,555,888 B2 | 1/2017 | Himmelmann | |
| 9,567,166 B2 | 2/2017 | Himmelmann | |
| 2002/0164236 A1 | 11/2002 | Fukuhara | |
| 2003/0121726 A1 * | 7/2003 | Berends | B66F 7/20 |
| | | | 187/209 |
| 2004/0241267 A1 | 12/2004 | Schultz | |
| 2004/0245397 A1 | 12/2004 | Garcia | |
| 2005/0063809 A1 * | 3/2005 | Walker | B65G 17/002 |
| | | | 414/528 |
| 2006/0096395 A1 * | 5/2006 | Weiss | B65G 49/061 |
| | | | 73/865.9 |
| 2007/0007391 A1 | 1/2007 | McCoskey | |
| 2007/0023259 A1 | 2/2007 | Schonauer | |
| 2007/0025832 A1 | 2/2007 | Rawdon et al. | |
| 2007/0074891 A1 | 4/2007 | Burke | |
| 2007/0125908 A1 | 6/2007 | Eichholz | |
| 2008/0011119 A1 | 1/2008 | Bartosch | |
| 2008/0257692 A1 | 10/2008 | Wallace | |
| 2008/0267751 A1 | 10/2008 | Safir | |
| 2009/0252568 A1 | 10/2009 | Morin | |
| 2009/0304482 A1 | 12/2009 | Sanford | |
| 2010/0000459 A1 * | 1/2010 | Colangelo | B63B 35/40 |
| | | | 114/259 |
| 2010/0006401 A1 | 1/2010 | Flury et al. | |
| 2010/0212982 A1 * | 8/2010 | Lin | B60V 3/025 |
| | | | 180/124 |
| 2011/0079427 A1 * | 4/2011 | Powale | H01B 3/427 |
| | | | 174/72 A |
| 2011/0215198 A1 | 9/2011 | Pazram et al. | |
| 2011/0240805 A1 | 10/2011 | Komiya | |
| 2011/0273313 A1 | 11/2011 | Hettwer | |
| 2012/0014757 A1 | 1/2012 | Müller | |
| 2012/0138434 A1 | 6/2012 | Trieb | |
| 2012/0170227 A1 | 7/2012 | Bayliss | |
| 2012/0262849 A1 | 10/2012 | Prax | |
| 2013/0011230 A1 * | 1/2013 | Barry | B61D 47/00 |
| | | | 414/399 |
| 2013/0075065 A1 | 3/2013 | Degner et al. | |
| 2013/0287505 A1 | 10/2013 | Seibt | |
| 2013/0313073 A1 | 11/2013 | Huber | |
| 2014/0097296 A1 | 4/2014 | Sankrithi | |
| 2014/0338557 A1 | 11/2014 | Zhou | |
| 2014/0367515 A1 | 12/2014 | Lohmann | |
| 2014/0373747 A1 | 12/2014 | Yagci | |
| 2014/0377017 A1 | 12/2014 | Panzram | |
| 2015/0158404 A1 * | 6/2015 | Pylypenko | B60N 2/525 |
| | | | 248/575 |
| 2015/0225082 A1 | 8/2015 | Levron | |
| 2015/0298808 A1 | 10/2015 | Huber | |
| 2016/0052630 A1 | 2/2016 | Himmelmann | |
| 2016/0101857 A1 | 4/2016 | Himmelmann et al. | |
| 2016/0101858 A1 | 4/2016 | Himmelmann | |
| 2016/0101859 A1 | 4/2016 | Himmelmann | |
| 2016/0101860 A1 | 4/2016 | Himmelmann | |
| 2016/0101861 A1 | 4/2016 | Himmelmann | |
| 2016/0101862 A1 | 4/2016 | Himmelmann | |
| 2016/0101863 A1 | 4/2016 | Himmelmann | |

(56) References Cited

U.S. PATENT DOCUMENTS

| | | |
|---|---|---|
| 2016/0101947 A1 | 4/2016 | Himmelmann |
| 2016/0194081 A1 | 7/2016 | Himmelmann |
| 2016/0194083 A1 | 7/2016 | Himmelmann |
| 2016/0221763 A1 | 8/2016 | Himmelmann |
| 2017/0043874 A1 | 2/2017 | Himmelmann |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 0377692 | 7/1990 |
| EP | 1547893 | 6/2005 |
| EP | 2815970 | 12/2014 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |
| WO | 2014049590 | 4/2014 |

OTHER PUBLICATIONS

Corrected Notice of Allowability dated Dec. 15, 2016 in U.S. Appl. No. 14/512,127.
Office Action dated Dec. 15, 2016 in U.S. Appl. No. 14/511,902.
Notice of Allowance dated Dec. 21, 2016 in U.S. Appl. No. 14/610,391.
Preinterview First Office Action dated Dec. 21, 2016 in U.S. Appl. No. 14/589,742.
U.S. Appl. No. 15/393,423, filed Dec. 29, 2016 and entitled Compact Centrifgual Air Blowers for Air Cushion Supported Cargo Loading Platform.
Extended European Search Report dated Jul. 4, 2016 in European Application No. 15189110.8.
Notice of Allowance dated Oct. 4, 2016 in U.S. Appl. No. 14/512,127.
Notice of Allowance dated Oct. 7, 2016 in U.S. Appl. No. 14/512,118.
Notice of Allowance dated Oct. 11, 2016 in U.S. Appl. No. 14/512,066.
Preinterview First Office Action dated Oct. 25, 2016 in U.S. Appl. No. 14/610,391.
Office Action dated Oct. 26, 2016 in U.S. Appl. No. 14/511,559.
Corrected Notice of Allowability dated Oct. 27, 2016 in U.S. Appl. No. 14/512,118.
Corrected Notice of Allowability dated Oct. 27, 2016 in U.S. Appl. No. 14/512,127.
Corrected Notice of Allowability dated Nov. 1, 2016 in U.S. Appl. No. 14/512,011.
Himmelmann, et al., U.S. Appl. No. 15/373,536, filed Dec. 9, 2016 and entitled Pressure Compensating Air Curtain for Air Cushion Supported Cargo Loading Platform.
Himmelmann, et al., U.S. Appl. No. 15/393,423, filed Dec. 29, 2016 and entitled Compact Centrifgual Air Blowers for Air Cushion Supported Cargo Loading Platform.
Final Office Action dated Feb. 24, 2017 in U.S. Appl. No. 14/512,056.
Notice of Allowance dated Mar. 10, 2017 in U.S. Appl. No. 14/511,559.
Corrected Notice of Allowability dated Apr. 10, 2017 in U.S. Appl. No. 14/511,559.
First Action Interview Office Action dated Apr. 18, 2017 in U.S. Appl. No. 14/589,742.
Restriction Requirement dated Apr. 20, 2017 in U.S. Appl. No. 15/373,536.
Notice of Allowance dated May 16, 2017 in U.S. Appl. No. 14/512,056.
Extended European Search Report dated Feb. 9, 2016 in European Application No. 15181603.0.
Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Notice of Allowance dated Mar. 24, 2016 in U.S. Appl. No. 14/512,113.
USPTO; First Action Interview Office Action dated Sep. 8, 2016 in U.S. Appl. No. 14/512,056.
USPTO; Supplemental Notice of Allowability dated Jun. 3, 2016 in U.S. Appl. No. 14/512,113.
Extended European Search Report dated Jun. 22, 2016 in European Application No. 16153483.9.
USPTO; Pre-Interview First Office Action dated Jun. 30, 2016 in U.S. Appl. No. 14/512,056.
Extended European Search Report dated Jul. 11, 2016 in European Application No. 1615150.7.
Partial European Search Report dated Mar. 18, 2016 in European Application No. 15189110.8.
USPTO; Notice of Allowance dated Apr. 1, 2016 in U.S. Appl. No. 14/511,645.
USPTO; Final Office Action dated Apr. 22, 2016 in U.S. Appl. No. 14/511,559.
USPTO; Supplemental Notice of Allowability dated May 3, 2016 in U.S. Appl. No. 14/512,113.
USPTO; Pre-Interview First Office Action dated Sep. 4, 2015 in U.S. Appl. No. 14/512,000.
USPTO; Notice of Allowance dated Oct. 19, 2015 in U.S. Appl. No. 14/512,000.
USPTO; Notice of Allowance dated Nov. 13, 2015 in U.S. Appl. No. 14/464,323.
USPTO; Office Action dated Nov. 17, 2015 in U.S. Appl. No. 14/511,559.
USPTO; Corrected Notice of Allowance dated Jan. 7, 2016 in U.S. Appl. No. 14/464,323.
USPTO; Pre-Interview First Office Action dated Jan. 7, 2016 in U.S. Appl. No. 14/512,113.
USPTO; Notice of Allowance dated Jan. 20, 2016 in U.S. Appl. No. 14/511,553.
USPTO; Notice of Allowance dated Oct. 11, 2016 in U.S. Appl. No. 14/512,011.

\* cited by examiner

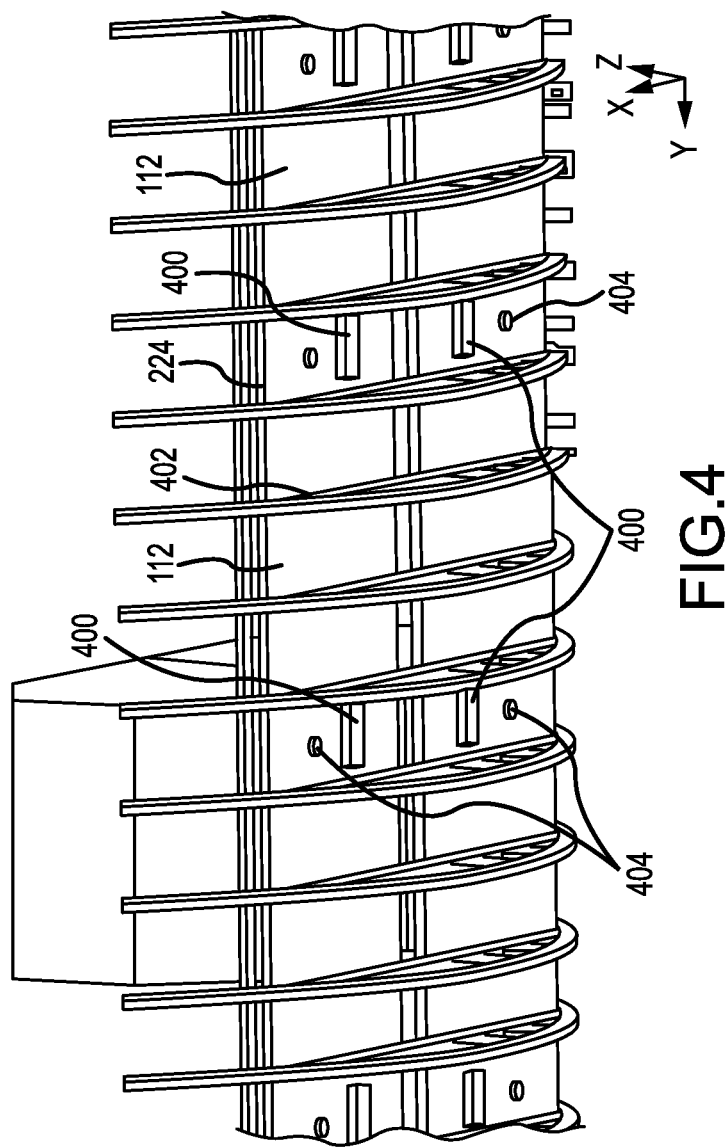

AIR CUSHION AIRCRAFT CARGO LOADING SYSTEMS AND WIRELESS COMMUNICATION UNIT

CROSS-REFERENCE TO RELATED APPLICATIONS

This U.S. Divisional Application claims priority to U.S. patent application Ser. No. 14/512,011, filed Oct. 10, 2014 and entitled AIR CUSHION AIRCRAFT CARGO LOADING SYSTEMS AND WIRELESS COMMUNICATION UNIT, which is incorporated herein by reference in its entirety.

FIELD

The present disclosure relates to aircraft cargo loading systems, and, more specifically, to a wireless communication unit of an aircraft cargo loading system.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

A cargo management system is provided comprising an air cushion cargo shuttle, an air blower configured to blow air beneath the air cushion cargo shuttle, and a first wireless communication device on the air cushion cargo shuttle.

In various embodiments, a second wireless communication device may be separate from the air cushion cargo shuttle. The second wireless communication device may communicate with the first wireless communication device by an 802.11 compliant link. A control system may communicate with the first wireless communication device. The control system may use an 802.11 compliant link. The control system may control forward and aft movement of the air cushion cargo shuttle. The control system may also control the air blower. The control system and the first wireless communication device may use a UHF link. The control system may communicate with the first wireless communication device through a second wireless communication device.

A cargo shuttle may comprise a wireless communication device on the cargo shuttle, and a power drive unit on the cargo shuttle.

In various embodiments, the power drive unit may receive instructions through the wireless communication device. An air blower on the shuttle may receive instructions through the wireless communication device. An energy storage module on the cargo shuttle may be electrically coupled to the wireless communication device. The wireless communication device may transmit a status of the cargo shuttle. The wireless communication device may also receive an instruction by an 802.11 compliant link.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures.

FIG. 4 illustrates the underside of a cargo management system, in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
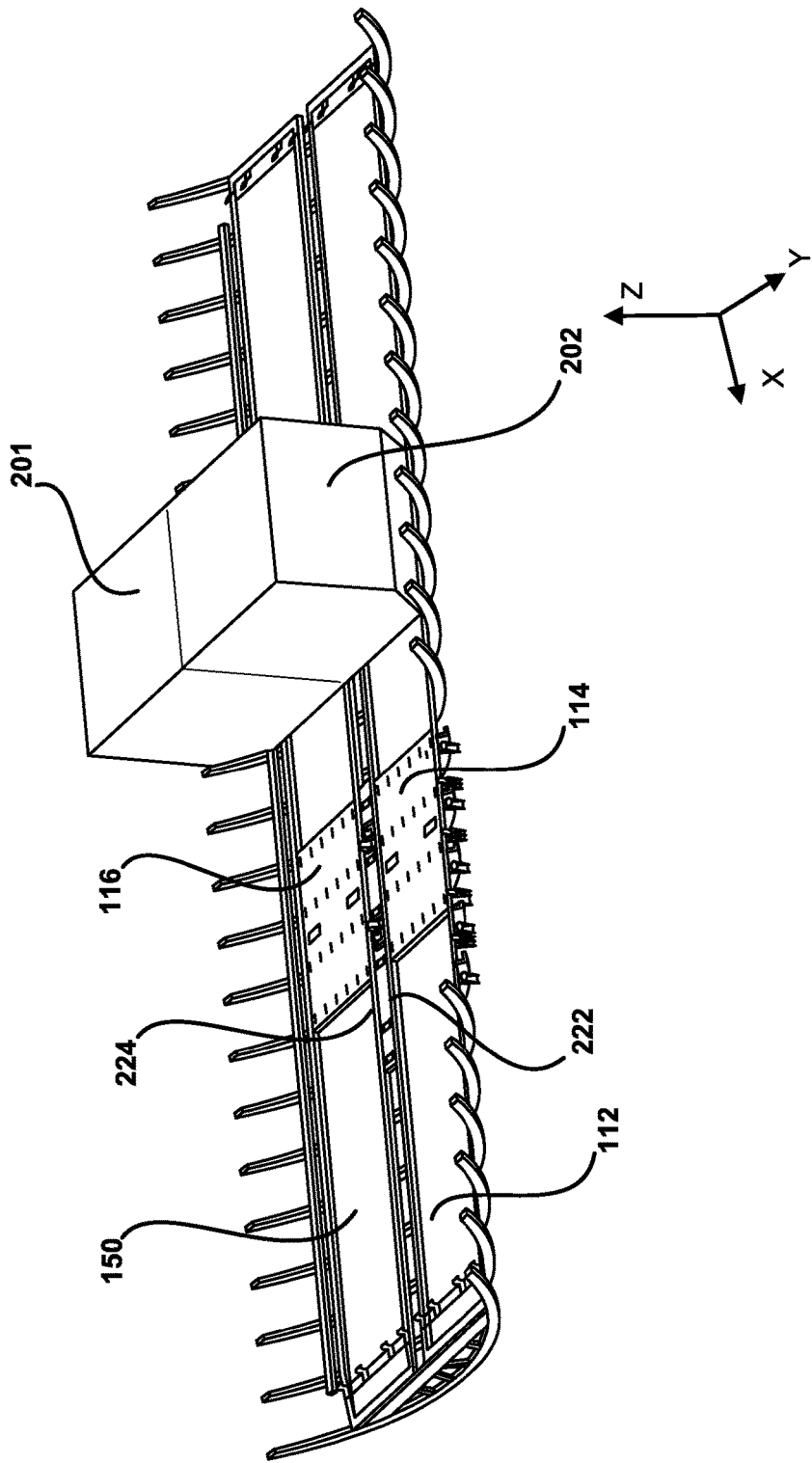
FIG. 1 illustrates a portion of a cargo management system, in accordance with various embodiments.

With reference to FIG. 1 aircraft cargo management system 100 is illustrated using an x, y, and z axes for ease of illustration. Air cushion cargo shuttle 114 and 116 are shown forward of an aft portion of an aircraft. Floor panel 112 is shown beneath air cushion cargo shuttle 114. Floor panel 150 is shown beneath air cushion cargo shuttle 116. As used with respect to air cushion cargo shuttle 114 and 116, the term "beneath" may refer to the negative z direction. Support rails 222 and 224 are shown laterally adjacent to floor panels 112 and 150. Support rails 222 and 224 may be mounted to another aircraft component, such as an airframe, and may be capable of supporting the weight of cargo. Floor panel 112 may comprise at least one of a composite material or a metallic material.

Cargo 202 is shown as resting on support rails 222 and cargo 201 is shown as resting on support rails 224. Cargo shuttle 116 may be used to lift cargo 201 (in a positive z direction) off support rails 224 and move cargo 201 forward or aft.

Figure 2:
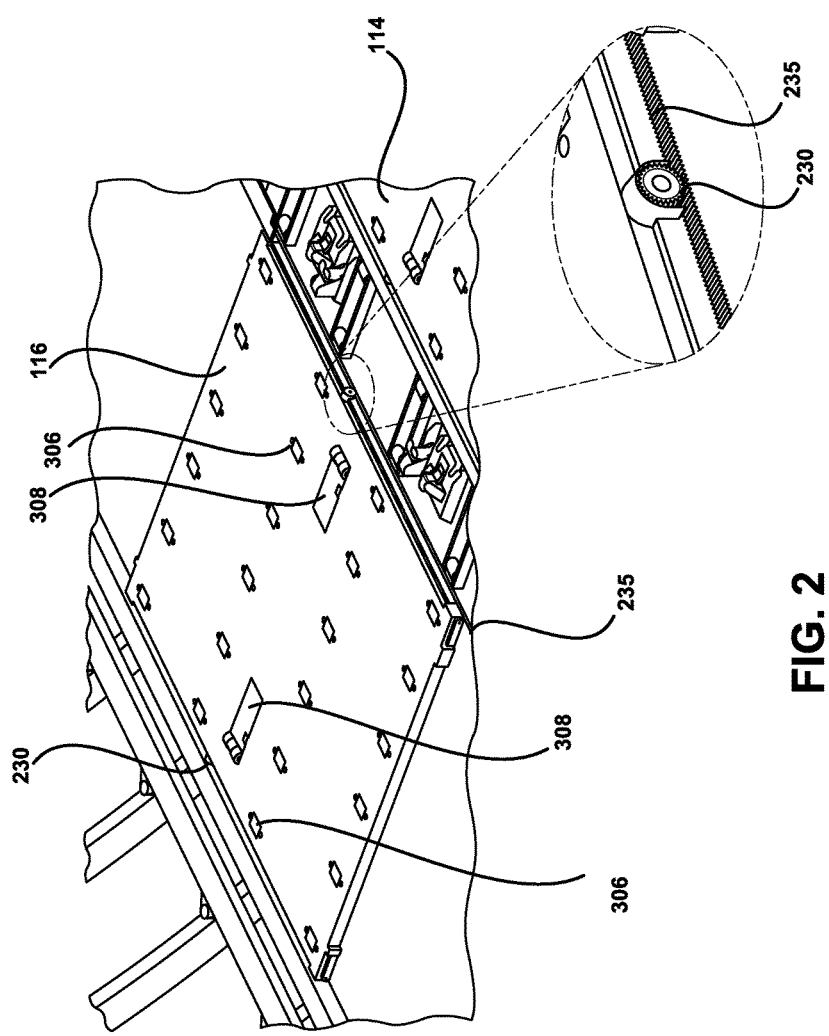
FIG. 2 illustrates a portion of a cargo management system, in accordance with various embodiments.
Figure 3A:
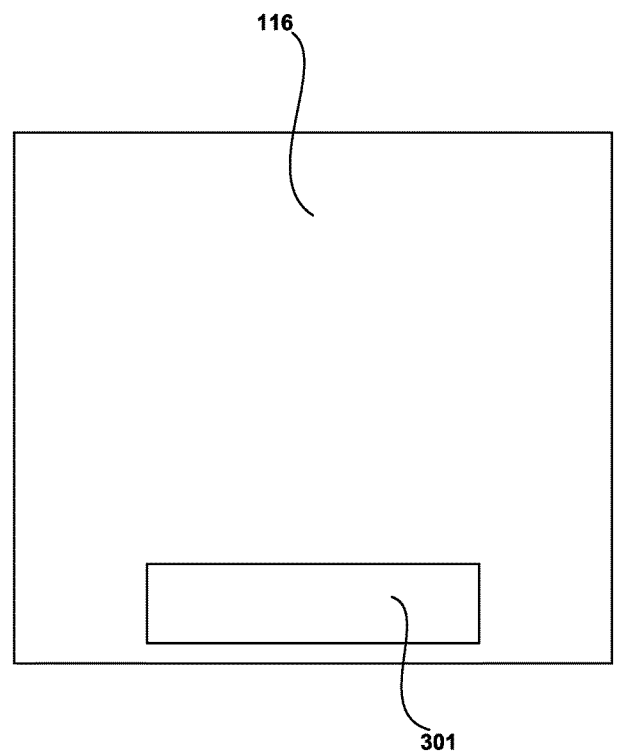
FIG. 3A illustrates an air cushion cargo shuttle guide assembly, in accordance with various embodiments.
Figure 3B:
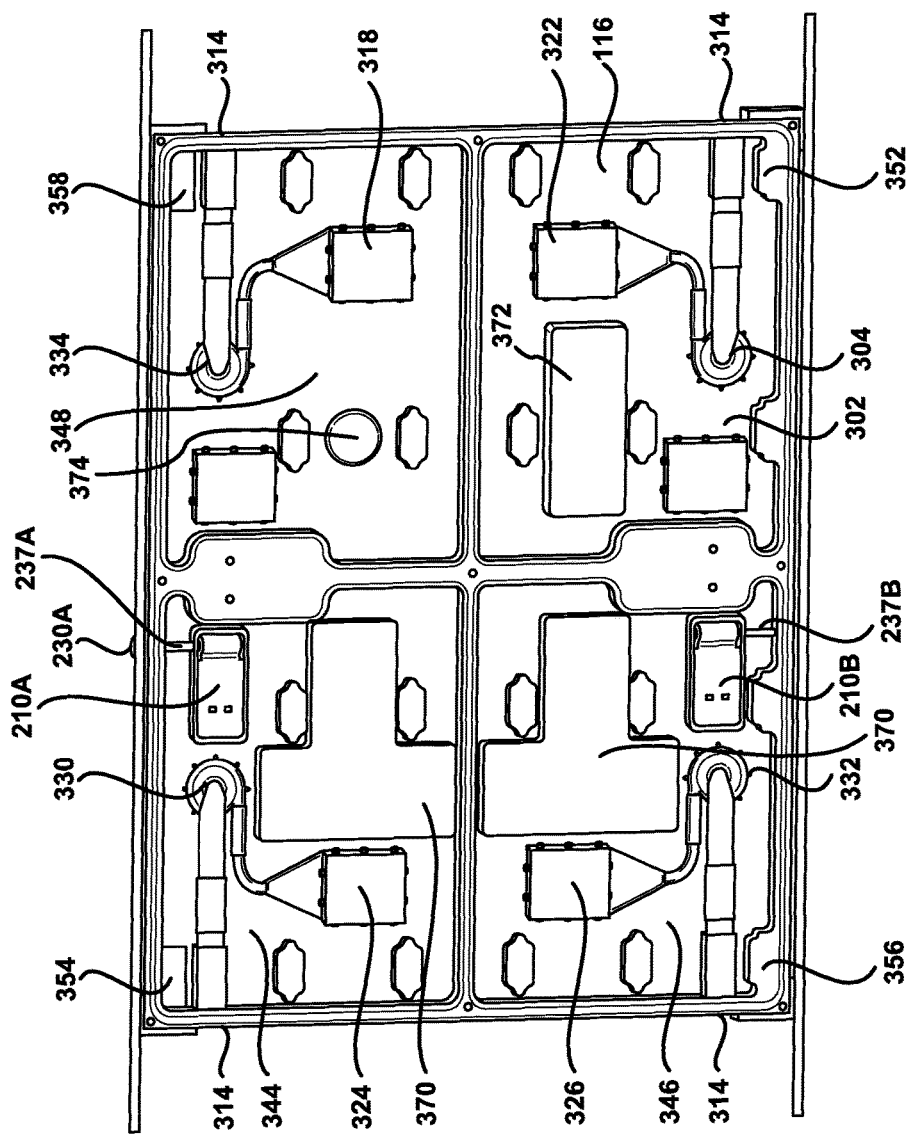
FIG. 3B illustrates the underside of an air cushion cargo shuttle guide assembly, in accordance with various embodiments.

With reference to FIGS. 2, 3A and 3B, air cushion cargo shuttle 116 is shown. It should be understood that air cushion cargo shuttle 114 is similarly structured and thus the features discussed herein relative to air cushion cargo shuttle 116 are also applicable to air cushion cargo shuttle 114. With reference to FIG. 3A, cargo shuttle 116 may comprise a shuttle drive unit 301 (SDU). SDU 301 may be a unit which travels with the cargo down the length of the aircraft. SDU 301 may take any form. SDU 301 may be configured to accelerate and decelerate a load on top of cargo shuttle 116. SDU 301 may be configured such that cargo shuttle 116 is self-propelled. As used herein "self-propelled" may refer to internally producing a force which results in lateral motion. SDU 301 may take the form of a rack and pinion system, where movement of at least one of the rack or the pinion results in movement of cargo shuttle 116. SDU 301 may take the form of a wheel and track. SDU 301 may take the form of a linear motion machine. According to various embodiments, and with reference to FIG. 3B, a shuttle drive system is disclosed which comprises a SDU 301 unit and a shuttle drive guide (e.g., the rack, rail, track, and/or the like etc. on which the SDU 301 rides. According to various embodiments, SDU 301 comprises at least one power drive unit 210.

Power drive unit 210 may be coupled to cargo shuttle 116. Power drive unit 210 may be configured to move the cargo shuttle 116 either forward or rearward, e.g., such as to move a cargo container to a desired location and/or move cargo shuttle 116 to a desired location. Though any desired mechanism for achieving movement may be utilized, according to various embodiments and with renewed reference to FIG. 2, a rack 235 and pinion 230 system may be utilized. For instance, the rack 235 and pinion 230 may comprise a pair of members with interlocking gear teeth that convert rotational motion of pinion 230 into linear motion of cargo shuttle 116 with respect to rack 235. Thus, a generally circular gear referred to herein as the pinion 230 may engage gear teeth on a generally linear gear bar referred to herein as the rack 235. Rotational motion applied to the pinion 230 may impart movement of cargo shuttle 116 with respect to rack 235, thereby translating the rotational motion of pinion 230 into the linear motion of cargo shuttle 116.

With reference to FIG. 3B, rotation of a shaft 237 coupled to the pinion 230 is converted to linear motion. The shaft may be rotated by a motor, e.g., power drive unit 210. Power drive unit 210 may be coupled to a power source. The power source may be any desired power source. For instance, the power source may be an energy storage unit 370 housed on air cushion cargo shuttle 116 and/or a battery external to air cushion cargo shuttle 114 (not shown). Energy storage unit 370 may comprise one or more batteries to store electrical energy. Energy storage unit 370 may be coupled to inductive charging receiver 372. Inductive charging receiver may be inductively coupled with an inductive charging station to facilitate wireless charging of air cushion cargo shuttle 114. Air cushion cargo shuttle 114 may further comprise wireless communication device 374 electrically coupled to energy storage unit 370 to facilitate wireless control of air cushion cargo shuttle 114.

With continued reference to FIG. 2, power drive unit 308 and roller 306 are shown in air cushion cargo shuttle 114. Power drive unit 308 may drive cargo such as cargo 201, onto and off air cushion cargo shuttle 114. Roller 306 may facilitate movement of cargo 201 with respect to air cushion cargo shuttle 114.

In various embodiments, air cushion cargo shuttle 116 may comprise a friction reduction system such as an air blower, slide bushing system, or other friction reducing systems to reduce the force exerted by SDU 301 to move air cushion cargo shuttle 116. For example, centrifugal air blower 304 is shown coupled beneath air cushion cargo shuttle 116. Air cushion cargo shuttle 116 may comprise one or more centrifugal air blowers. Centrifugal air blower 304 is controlled by centrifugal air blower controller 322. Air cushion cargo shuttle 114 may comprise one or more centrifugal air blower controllers. In various embodiments, each centrifugal air blower has one associated centrifugal air blower controller, though in various embodiments one centrifugal air blower controller controls multiple centrifugal air blowers. Centrifugal air blower controller 322 may provide power and instructions to centrifugal air blower 304 to control how and when centrifugal air blower 304 operates. Centrifugal air blower 304 comprises inlets 314. Inlets 314 allow the centrifugal air blower 304 to receive air from outside volume 302 and deliver that air to volume 302. In various embodiments, each centrifugal air blower has one associated inlet, though in various embodiments one centrifugal air blower is associated with multiple inlets. In further embodiments, a single inlet may supply air to one or more centrifugal air blowers.

Volume 302 of air cushion cargo shuttle 116 is shown in fluid communication with an outlet of centrifugal air blower 304. In that regard, centrifugal air blower 304 may blow air beneath air cushion cargo shuttle 116 and, more specifically, into volume 302. Volume 302 is shown in proximity to floor panel 150 (with brief reference to FIG. 1).

As shown, air cushion cargo shuttle 116 has four centrifugal air blower controllers 322, 324, 326, and 318 driving four centrifugal air blowers 304, 330, 332, and 334 to blow air into four different volumes 302, 344, 346, and 348. Each centrifugal air blower controller may further comprise a proximity sensor that may be configured to measure the proximity of a portion of air cushion cargo shuttle 116 to floor panel 150 (with brief reference to FIG. 1). For example, location sensors, such as proximity sensors 352, 354, 356 and 358 may be associated with each centrifugal air blower controller 322, 324, 326, and 318. Proximity sensors 352, 354, 356 and 358 may be used in a closed loop control mechanism to modulate the output of four centrifugal air blowers 304, 330, 332, and 334. In that regard, centrifugal air blower controllers 322, 324, 326, and 318 may command four centrifugal air blowers 304, 330, 332, and 334 to blow air into volumes 302, 344, 346, and 348 until the proximity sensors 352, 354, 356 and 358 indicate that a desired proximity has been reached.

Moreover, data from proximity sensors 352, 354, 356 and 358 may be used to detect and compensate for uneven cargo loads. For example, in the event cargo 201 shifts to one portion of air cushion cargo shuttle 116 or otherwise exerts more force on a portion of air cushion cargo shuttle 116 relative to another, data from proximity sensors 352, 354, 356 and 358 may detect that one portion of air cushion cargo shuttle 116 is not as far from floor 150 as one or more other portions of air cushion cargo shuttle 116. In that regard, where insufficient distance from floor panel 150 is achieved, a centrifugal air blower controller may command its associated centrifugal air blower to increase output to compensate for the uneven load.

In that regard, in operation, cargo such as cargo 201 may be loaded onto air cushion cargo shuttle 116 at an aft position. Cargo 201 may be positioned onto air cushion cargo shuttle 116 using power drive unit 308 and roller 306. During loading of cargo 201, air cushion cargo shuttle 116 may be in contact with floor panel 150. Once cargo 201 is suitably positioned on top of air cushion cargo shuttle 116 (where the phrase "on top" in this context may refer to distance across the positive z direction), a control system for centrifugal air blower controller 322 may instruct centrifugal air blower 304 to begin operation. In this manner, air from inlets 314 is pulled into centrifugal air blower 304 and centrifugal air blower 304 blows this air into volume 302. As more air is blown into volume 302, the increased air pressure may act to lift air cushion cargo shuttle 116 apart from floor panel 150. In this context, the phrase "lift apart" may refer to movement of air cushion cargo shuttle 116 in the positive z direction. In various embodiments, the pressure in volume 302 may reach between 1 psi (6.89 kPa) to 10 psi (68.9 kPa), between 2 psi (13.7 kPa) and 6 psi (41.3 kPa), and about 4 psi (27.5 kPa), where the term about in this context may refer to +/−0.5 psi (3.4 kPa).

A control system comprising, for example, a processor and a tangible, non-transitory memory may be configured to be in electrical and/or logical communication, such as wired or wireless communication, with centrifugal air blower controller 322. The control system may instruct the centrifugal air blower controller 322 to start, stop, and modulate the output of centrifugal air blower 304. Centrifugal air blower 304 may be coupled to energy storage unit 370 and provide power for centrifugal air blower 304.

During operation of centrifugal air blower 304, cargo 201 may lift apart from floor panel 150, thus reducing the friction between air cushion cargo shuttle 116 and the floor panel 150. Stated another way, dry friction may be equal to the coefficient of friction multiplied by the normal force. By eliminating the contact between air cushion cargo shuttle 116 and the floor panel 150, the two surfaces do not interact to cause friction. In various embodiments, there may be contact between air cushion cargo shuttle 116 and the floor panel 150 during operation of centrifugal air blower 304, though the air pressure will oppose the normal force (i.e., force in the negative z direction) exerted by cargo 201 and thus friction will be reduced because of this reduction in the normal force.

With renewed reference to FIG. 2. while cargo 201 is lifted apart from floor panel 150, a force exerted by SDU 301 may cause cargo shuttle 116 to move (e.g., torque exerted by power drive unit 210A, 210B on shaft 237A, 237B may cause pinion 230A, 230B, to rotate, causing cushion cargo shuttle 116 to move linearly with respect to rack 235). The control system may instruct the centrifugal air blower controller 322 to turn off or lower the output of centrifugal air blower 304. In that regard, due to loss of air pressure in volume 302, air cushion cargo shuttle 116 may move in a negative z direction and contact floor panel 150. As air cushion cargo shuttle 116 moves towards floor panel 150, cargo 201 may come to rest on support rails 224. Thus, the air cushion cargo shuttle 116 may separate from the cargo 201 as the cargo 201 is restrained from motion in the negative z direction by support rails 224. A force exerted by SDU 301 may cause cargo shuttle 116 to move from under cargo 201, such as back to a home position. In this manner, air cushion cargo shuttle 116 may be brought aft to load additional cargo. Additional cargo may now be loaded and the process may proceed again.

With reference to FIG. 4, platform wireless communication devices 404 are depicted beneath floor panel 112. One or more platform wireless communication device 404 may be situated between horizontal frame members 402 supporting floor panel 112. The position of platform wireless communication devices 404 beneath floor panel 112 may correspond with a transmission range or a receiving range of platform wireless communication devices 404. Platform wireless communication devices 404 may be spaced out to limit "dead spots" (i.e., poor signal areas) between platform wireless communication devices 404 and shuttle wireless communication device 374 on air cushion cargo shuttle 114. Platform wireless communication devices 404 may communicate with one another (e.g., in a forward or aft direction) to extend the range of communication with shuttle wireless communication device 374 of FIG. 3B.

In various embodiments, platform wireless communication devices 404 may be positioned anywhere on an aircraft within communication range of shuttle wireless communication device 374 of air cushion cargo shuttle 114. For example, platform wireless communication devices 404 may also be located in one or more of a ceiling of a cargo hold, a wall of the cargo hold, the support frame for the cargo loading system, or any other location within wireless communication range of air cushion cargo shuttle 114.

Figure 5:
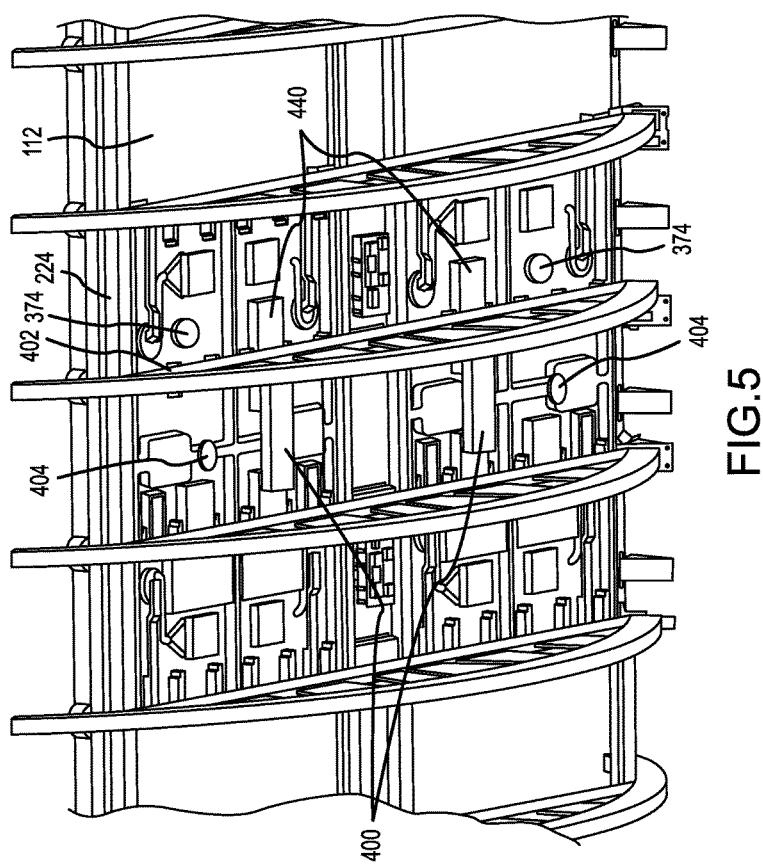
FIG. 5 illustrates an air cushion cargo shuttle in wireless communication with wireless devices, in accordance with various embodiments.

With reference to FIG. 5, platform wireless communication devices 404 beneath floor panel 112 are shown with floor panel 112 cutaway to reveal air cushion cargo shuttle 114 in wireless communication with platform wireless communication devices 404. Shuttle wireless communication device 374 and air cushion cargo shuttle 114 may be physically separate from platform wireless communication device 404 to facilitate wireless communication. Data may be transferred via platform wireless communication devices 404 and shuttle wireless communication device 374 in the form of signals, which may be electronic, electromagnetic, optical or other signals capable of being sent and received by platform wireless communication devices 404 and shuttle wireless communication device 374.

These signals may be provided to platform wireless communication devices 404 and shuttle wireless communication device 374 via a communications path (e.g., channel). This channel carries signals and may be implemented using wire, cable, fiber optics, a telephone line, a cellular link, a radio frequency (RF) link, wireless and other communications channels. In that regard, platform wireless communication device 404 and shuttle wireless communication device 374 may comprise any device capable of transmitting and/or receiving a signal wirelessly over a network. In various embodiments, such a signal may comprise an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a cellular signal, an infrared signal, an optical signal, or any other signal capable of transmitting and receiving information wirelessly to and from shuttle wireless communication device 374.

A network may be established comprising platform wireless communication device 404 and shuttle wireless communication device 374 using an electromagnetic wireless protocol. As used herein, the term "network" includes any cloud, cloud computing system or electronic communications system or method which incorporates hardware and/or software components. Communication among the devices on a network (e.g., platform wireless communication device 404 and shuttle wireless communication device 374) may be accomplished through any suitable communication channels, such as, for example, a telephone network, an extranet, an intranet, Internet, wireless devices (a personal digital assistant (e.g., iPhone®, Palm Pilot®, Blackberry®), cellular phone, or tablet), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system may be described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

Data may be transferred over a network via communications interface in the form of signals which may be electronic, electromagnetic, optical or other signals capable of being received by platform wireless communication devices 404 and shuttle wireless communication device 374. These signals are provided to communications interface via a communications path (e.g., channel). This channel carries signals and may be implemented using a wireless Ethernet network (e.g., an ad hoc network utilizing IEEE 802.11a/b/g/n/ac), Bluetooth (including Bluetooth low energy), infrared that itself may implement an ad hoc Ethernet network, or other suitable wireless communication medium. For example, platform wireless communication device 404 and shuttle wireless communication device 374 may communicate using TCP/IP over PPP via an 802.11a/b/g/n/ac RF connection.

Figure 6:
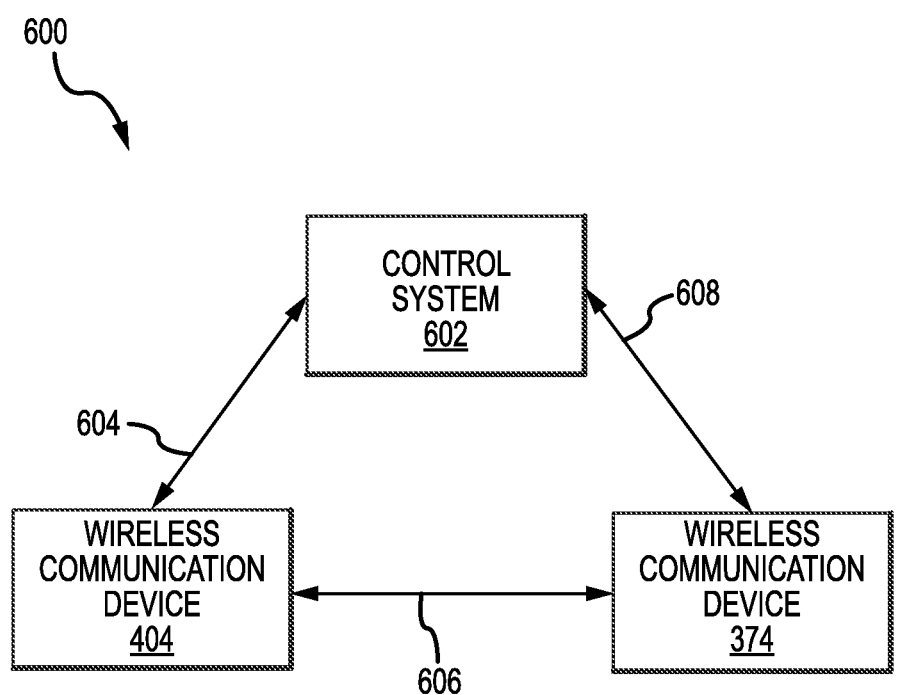
FIG. 6 illustrates a system for wireless communication in a cargo management system, in accordance with various embodiments.

With respect to FIG. 6, a wireless communication system 600 is shown for communicating with air cushion cargo shuttle 114 from FIG. 3B. Control system 602 may have communication link 604 with platform wireless communication device 404. Communication link 604 may be a physical connection through conductive conduit or a wireless connection. Instructions from control system 602 may be sent from platform wireless communication device 404 by wireless communication link 606 to shuttle wireless communication device 374. Shuttle wireless communication device 374 may send status information or a receipt confirmation to control system 602 by wireless communication link 606, platform wireless communication device 404, and communication link 604.

In various embodiments, control system 602 may have a direct communication link 608 with shuttle wireless communication device 374. Direct communication link 608 may be a wireless communication link. Instructions from control system 602 may be sent by direct communication link 608 to shuttle wireless communication device 374 on air cushion cargo shuttle 114. Shuttle wireless communication device 374 may send status information or receipt confirmation back to control system 602 by direct communication link 608. Wireless communication system 600 may allow a cargo management system to operate without physical wires directly connected to air cushion cargo shuttle 114.

In various embodiments, control system 602 may send instructions to shuttle wireless communication device 374 of air cushion cargo shuttle 114 including instructions to start or stop centrifugal air blowers. Control system 602 may also send instructions to air cushion cargo shuttle 114 to move forward or aft. Control system 602 may further send instructions to air cushion cargo shuttle 114 to load, unload, or move cargo by power drive units. Control system 602 may also receive information from air cushion cargo shuttle 114 including the weight of cargo load, proximity to floor panel 112, load balance information, and state information for components on air cushion cargo shuttle 114.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo shuttle having a top surface for receiving cargo, and configured and operable for mating engagement with both a cargo system support rails oriented along the long axis of an elongated storage enclosure and an air cushion, comprising:
   a wireless communication device disposed on the cargo shuttle; and
   a power drive unit disposed on the cargo shuttle the wireless communication device configured and operable to communicate with and control the power drive unit.

2. The cargo shuttle of claim 1, wherein the power drive unit is configured to receive instructions through the wireless communication device.

3. The cargo shuttle of claim 1, further comprising an air blower disposed on the cargo shuttle and configured to receive instructions through the wireless communication device.

4. The cargo shuttle of claim 1, further comprising an energy storage module disposed on the cargo shuttle and electrically coupled to the wireless communication device.

5. The cargo shuttle of claim 1, wherein the wireless communication device is configured to transmit a status of the cargo shuttle.

6. The cargo shuttle of claim 1, wherein the wireless communication device is confingured to receive an instruction by an 802.11 compliant link.

* * * * *